United States Patent Office 3,316,174
Patented Apr. 25, 1967

3,316,174
AGENTS FOR PREVENTING THE ELECTROSTATIC CHARGE OF SHAPED ARTICLES
Wolfgang Carl, Dormagen, Dietrich Glabisch, Leverkusen, and Alfred Reichle and Martin Wandel, Dormagen, Germany, assignors to Farbenfabriken Bayer Aktiengesellschaft, Leverkusen, Germany, a corporation of Germany
No Drawing. Filed June 14, 1963, Ser. No. 287,796
Claims priority, application Germany, July 3, 1962, F 37,215; Apr. 11, 1963, F 39,465
6 Claims. (Cl. 252—88)

It has been found that chlorohydrin compounds of the formula

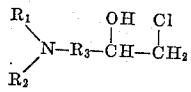

wherein $R_1$ denotes an aliphatic radical with at most 6 carbon atoms, which may also be substituted by a CN group, $R_2$ is an aliphatic radical with at least 6 carbon atoms, and $R_3$ denotes an alkylene radical with 1–3 carbon atoms, or the corresponding epoxide compounds can be used with excellent results as agents for preventing the electrostatic charge of shaped articles.

The chlorohydrin compounds to be used according to the invention and corresponding to the general formula wherein $R_3$ stands for the radical $CH_2$ are obtainable, for example, in that amines of the formula

wherein $R_1$ and $R_2$ have the significance given above, for example N-methyl-dodecylamine, N-ethyl-dodecylamine, N-methyl-hexadecylamine, N-methyl-stearylamine, N-ethyl-stearylamine, N-β-cyanethyl-octylamine, N-β-cyanethyl-decylamine, N-β-cyanethyl-dodecylamine, N-β-cyanethyl-hexadecylamine and N-β-cyanethyl-stearyl-amine, are reacted with epichlorohydrin or 1,3-dichloro-propanol-2 in the molecular ratio of 1 to at least 1, expediently in organic solvents, e.g. in methylene chloride, at temperatures of about 50° C., in the presence of salts of polyvalent metals such as aluminium chloride, tin tetrachloride or boron trifluoride. It is also possible to proceed in such a manner that the amines of the above-mentioned formula are reacted with haloalkenes, e.g. with 3-chloro- or 3-bromopropene-(1), or with 5-bromo-pentene-(1) in the molecular ratio 1.1 and the resultant products are then converted into the chlorohydrin compounds in known manner with alkali metal hypochlorite solutions.

The epoxide compounds which may also be taken into consideration according to the present invention as agents for preventing the electrostatic charge of shaped articles are obtainable in known manner from the corresponding chlorohydrin compounds by mixing solutions of the chlorohydrin compounds in organic solvents, for example in methylene chloride, with alkaline agents, for example sodium hydroxide, sodium carbonate or ammonia.

The agents according to the invention are used in the form of solutions in organic solvents, such as alcohols, esters and ketones, or in the form of aqueous emulsions or dispersions. In general, the agents are then applied to the shaped articles by spraying or impregnating at 20–60° C.; the articles are subsequently dried and briefly heated at 100–150° C.

By means of the proposed agents it is possible to impart an outstanding antistatic finish to articles of various types, for example fibres, filaments, fabrics, foils or films of natural or synthetic origin. A special advantage of the antistatic finish thus obtained is its fastness to washing. The following examples serve to illustrate the invention without, however, limiting it scope.

Example 1

Previously washed fabrics of polyacrylonitrile fibres are treated on the foulard with the emulsion described below, squeezed to a weight increase of 100% and dried at 80° C. to 85° C. for about 45 minutes. The dried fabrics are then heated at 120° C. for a further 10 minutes. After this treatment, the surface resistance of the fabrics at 20° C. and 50% relative atmospheric humidity has fallen from $10^{13}\Omega$ to $10^8\Omega$. When the fabrics are washed with a washing liquor containing per litre 2 g. of a commercial alkylaryl sulphonate, 10 to 15 times at 40° C., followed each time by eight rinsings, in a fully automatic process, the surface resistance amounts at most to $10^{10}\Omega$.

The emulsion used is prepared as follows: A solution of 283.6 g. of N-methyl-stearylamine in 400 ml. of methylene chloride is gradually mixed with 92.5 g. of epichlorohydrin at boiling temperature while stirring, after the addition of 1 g. of aluminium chloride. After the addition of the epichlorohydrin, the reaction mixture is further stirred for 5 hours; the temperature which had risen to 45° C. due to the addition of the epichlorohydrin, falls to room temperature. The chlorohydrin compound formed, i.e. N - methyl-N-stearyl-(β-hydroxy-γ-chloro)-propylamine, is dried at 45° C. after distilling off the solvent in a vacuum, and ground to a fine powder. 25 g. of the resultant powder are then stirred with 100 ml. of water at 60° C.; after the addition of 2.8 ml. of glacial acetic acid, the emulsion formed is made up to 925 ml. with water at 60° C., and subsequently treated with 75 ml. of a 1 N sodium hydroxide solution. The pH value of the emulsion then amounts to about 10.5.

Example 2

Previously washed fabrics of polyamide fibres are treated on the foulard with the emulsion described in Example 1, squeezed to a weight increase of 100% and dried at 80 to 85° C. The fabrics are subsequently heated at 120° C. for a further 10 minutes. After this treatment, the surface resistance of the fabrics at 20° C. and 50% relative atmospheric humidity has fallen from $10^{13}\Omega$ to $10^8\Omega$. After 10 to 15 washings, the surface resistance amounts to at most $10^{11}\Omega$, the charge of the fabrics is below 2000 volt/m., and the half-value period amounts to at most 3 seconds.

Example 3

Previously washed fabrics of polyamide fibres are treated on the foulard with the emulsion described below, squeezed to a weight increase of 100% and dried at 80° C. to 85° C. for about 45 minutes. The dried fabrics are then heated at 120° C. for a further 10 minutes. After this treatment, the surface resistance of the fabrics at 20° C. and 50% relative atmospheric humidity has fallen from $10^{13}\Omega$ to $10^9\Omega$. The anti-electrostatic finish thus obtained is very fast to washing.

The emulsion employed is prepared as follows: A solution of 199.6 g. of N-methyl-dodecylamine in 400 ml. of methylene chloride is gradually mixed, after the addition of 1 g. of aluminium chloride, with 92.5 g. of epichlorohydrin at boiling temperature while stirring. The reaction mixture is then further stirred for 5 hours; the temperature which had risen to 60° C. due to the addition of epichlorohydrin, thereby falls to room temperature. After distilling off the solvent, the resultant chlorohydrin compound, i.e. N-methyl-N-dodecyl-(β-hydroxy-γ-chloro)-propylamine, is stirred for 4 hours in a vacuum at 10 mm. Hg. 25 g. of the chlorohydrin compound are then stirred with 100 ml. of water at 60° C.; after the addition of 2.5 ml. of glacial acetic acid, the emulsion formed is made up to 1 litre with water at 60° C., and then adjusted to a pH value of 8 with 1 N sodium hydroxide solution.

Example 4

Previously washed fabrics of polyacrylonitrile fibres are treated on the foulard with the emulsion described in Example 3, squeezed to a weight increase of 100% and dried at 80 to 85° C. The fabrics are subsequently heated at 120° C. for a further 10 minutes. After this treatment, the surface resistance of the fabrics at 20° C. and 50% relative atmospheric humidity has fallen from $10^{13}\Omega$ to $10^8\Omega$. The fastness to washing of the anti-electrostatic finish thus obtained is excellent.

Example 5

Previously washed fabrics of polyacrylonitrile, polyamide or polyester fibres are treated on the foulard with the emulsion described below, squeezed to a weight increase of 100% and dried at 70–85° C. for about 45 minutes. The dried fabrics are then heated at 120° C. for a further 10 minutes. After this treatment, the surface a resistance of the fabrics at 20° C. and 50% relative atmospheric humidity has fallen from $10^{13}\Omega$ to $10^7\Omega$. When these fabrics are washed in a fully automatic process with a washing liquor containing per litre 2 g. of a commercial surface-active alkylaryl sulphonate, 15 to 20 times at 40° C., followed each time by eight rinsings the surface resistance amounts to at most $10^{10}\Omega$.

The emulsion employed is prepared as follows: 185 g. of dodecylamine are treated with 53 g. of acrylonitrile and the resultant N-β-cyanethyl-dodecylamine is reacted with 92.5 g. of epichlorohydrin. The chlorohydrin compound formed, i.e. N-β-cyanethyl - N - dodecyl - (β - hydroxy - γ- chloro)-propylamine, is kept in a vacuum under a pressure of about 1 mm. Hg for 3 to 4 hours, in order to remove the unreacted volatile starting materials. 30 g. of the liquid reaction product are then dissolved in 100 ml. of methyl alcohol, the solution is made up to 1 litre with cold water and adjusted to a pH value of 3.5 with glacial acetic acid; prior to use the pH value of the solution is increased with alkali to 5.5.

Instead of the aforesaid emulsion there can also be used with good results emulsions which are prepared by using for the process described above for the preparation of the chlorohydrin compound from dodecylamine, acrylonitrile and epichlorohydrin, instead of dodecylamine, the equivalent amount of another aliphatic amine with at least 6 carbon atoms, for example decylamine, hexadecylamine or stearylamine.

For treating the fabrics, an aqueous emulsion can also be used which is prepared as follows: 199 g. of N-methyl-dodecylamine are mixed dropwise with 71.5 g. of 3-chloro-propene-(1) at about 44° C. while stirring and cooling under reflux. The unreacted starting material is then distilled off under vacuum and the resultant reaction product mixed, while cooling to 5° C., with a solution of 74.4 g. of sodium hypochlorite in 200 ml. of water, and stirred at room temperature for 10 hours. The reaction mixture is then mixed with 500 ml. of water and the separated chlorohydrin compound, i.e. N-methyl-N-dodecyl-(β-hy-droxy-γ-chloro)-propylamine, filtered off. 25 g. of the chlorohydrin compound are then stirred with 100 ml. of water at 60° C.; after the addition of 2.5 ml. of glacial acetic acid, the emulsion formed is made up to 1 litre with water at 60° C., and subsequently adjusted to a pH value of 8 within 1 N sodium hydroxide solution.

The fabrics can also be treated with emulsions which have been prepared by using in the last-mentioned process for the preparation of the chlorohydrin compounds, instead of N-methyl-dodecylamine, another secondary aliphatic amine of the formula mentioned at the beginning:

for example N-ethyl-dodecylamine, N-methyl-hexadecyl-amine, N-methyl-stearylamine, N-ethyl-stearylamine, N-β-cyanethyl-octylamine, N-β-cyanethyl - decylamine, N - β-cyanethyl-dodecylamine, N-β - cyanethyl - hexadecylamine and N-β-cyanethyl-stearylamine.

Furthermore, also those emulsions are suitable for treating the fabrics which have been obtained by using in the above-mentioned preparation of the chlorohydrin compounds from N-methyl-dodecylamine or other secondary amines, instead of 3-chloro-propene-(1), the equivalent amount of 5-bromo-pentene-(1).

Finally, the fabrics can also be treated with emulsions which, instead of the above-mentioned chlorohydrin compounds, contain the corresponding epoxide compounds and have been prepared, for example, as follows: 255 g. of the chlorohydrin compound N-methyl-N-dodecyl-(β-hy-droxy-β-chloro)-propylamine or an equivalent amount of another of the aforesaid chlorohydrin compounds are dissolved in 500 ml. of methylene chloride and stirred at room temperature for 2 to 3 hours with 40 g. of powdered sodium hydroxide. The solution is subsequently filtered and the solvent distilled off. 25 g. of the epoxide compound thus obtained are then stirred with 100 ml. of water at 60° C.; after the addition of 2.5 ml. of glacial acetic acid, the emulsion formed is made up to 1 litre with watr at 60° C., and subsequently adjusted to a pH value of 8 with 1 N sodium hydroxide solution.

Example 6

Shaped articles such as foils, sheets and containers of polyester, polyacrylic or polyamide material are sprayed or treated by the dip-method with alcoholic solutions or aqueous-alcoholic emulsions containing 0.1 to 5% of the chlorohydrin compounds mentioned in Example 5, and subsequently dried at room temperature. The surface resistance of the materials thus treated has then fallen from $10^{13}\Omega$ to $10^8\Omega$. The adhesiveness of the antistatic finish is excellent; after rubbing 20 times with calico and soaking in water for 2 to 10 hours, the surface resistance amounts to at most $10^{10}\Omega$.

We claim:
1. A method for imparting a wash-fast antistatic finish to a material comprising at least one member selected from the group consisting of polyacrylonitriles, polyamides, polyacrylics, polyesters and shaped articles thereof, comprising spraying or impregnating the material with a solution or emulsion consisting essentially of a substantial antistatic amount of a composition selected from the group consisting of

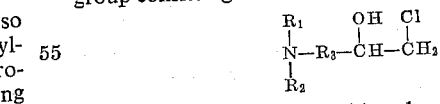

and the corresponding epoxide, wherein
  $R_1$ is a member selected from the group consisting of an aliphatic hydrocarbon moiety containing not more than 6 carbon atoms, and cyano-substituted aliphatic hydrocarbon moiety containing not more than 6 carbon atoms;
  $R_2$ is alkyl having 6–18 carbon atoms; and
  $R_3$ is an alkylene moiety of 1–3 carbon atoms.
2. The process of claim 1 comprising drying the treated material and after-heating to a temperature of about 100–150° C.
3. The process of claim 1 wherein the active composition is a compound of the formula

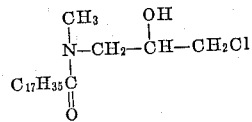

4. The process of claim 1 wherein the active composition is a compound of the formula

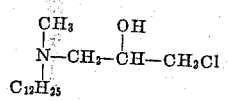

5. The process of claim 1 wherein the active composition is a compound of the formula

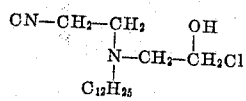

6. The method of claim 1 wherein $R_1$ is a member selected from the group consisting of alkyl and cyanoalkyl, the alkyl moiety having 1-3 carbon atoms.

References Cited by the Examiner

UNITED STATES PATENTS

| 2,541,089 | 2/1951 | Nikawitz | 260—584 X |
| 3,031,504 | 4/1962 | Pollitzer | 260—584 |

FOREIGN PATENTS

| 602,332 | 5/1948 | Great Britain. |

LEON D. ROSDOL, *Primary Examiner.*

JULIUS GREENWALD, *Examiner.*

J. T. FEDIGAN, *Assistant Examiner.*